United States Patent
Kang

[11] Patent Number: 6,089,114
[45] Date of Patent: Jul. 18, 2000

[54] BICYCLE TRANSMISSION WITH SELECTABLE AUTOMATIC DOWN SHIFTING

[76] Inventor: In H. Kang, 1850 Calle Fortuna, Glendale, Calif. 91208

[21] Appl. No.: 09/356,421

[22] Filed: Jul. 19, 1999

[51] Int. Cl.[7] .................. F16H 3/10; F16H 3/34
[52] U.S. Cl. ................. 74/349; 74/331; 74/348; 74/594.2; 74/665 GA
[58] Field of Search ............... 74/331, 332, 333, 74/348, 349, 594.2, 665 GA; 192/64

[56] References Cited

U.S. PATENT DOCUMENTS

| | | | |
|---|---|---|---|
| 652,275 | 6/1900 | Krastin | 74/354 |
| 2,538,625 | 1/1951 | Moore | 74/354 |
| 3,162,058 | 12/1964 | Matthew | 74/354 |
| 3,209,609 | 10/1965 | Kirschmann | 74/349 |
| 3,920,263 | 11/1975 | Bundschuh | 280/236 |
| 5,553,510 | 9/1996 | Balhorn | 74/354 |

*Primary Examiner*—Charles A Marmor
*Assistant Examiner*—Ha Ho
*Attorney, Agent, or Firm*—John K. Park; Park & Sutton LLP

[57] ABSTRACT

A multi-speed transmission for bicycles, comprising: a housing including spaced, opposing face plates, each face plate having a pedal shaft opening and a secondary shaft opening; a pedal shaft rotatably disposed within said pedal shaft openings; a secondary shaft disposed within said secondary shaft openings, wherein the secondary shaft is spaced from the pedal shaft and substantially parallel thereto; and a pedal shaft set of gears mounted on the pedal shaft between the face plates, comprising: (1) a first set of pedal shaft gears mounted on the pedal shaft, (2) a second set of pedal shaft gears rotatably mounted on the pedal shaft, and (3) a third set of pedal shaft gears rotatably mounted on the pedal shaft including first means for selective driving engagement with the second set of pedal shaft gears, the third set of pedal shaft gears including a drive gear means.

23 Claims, 17 Drawing Sheets

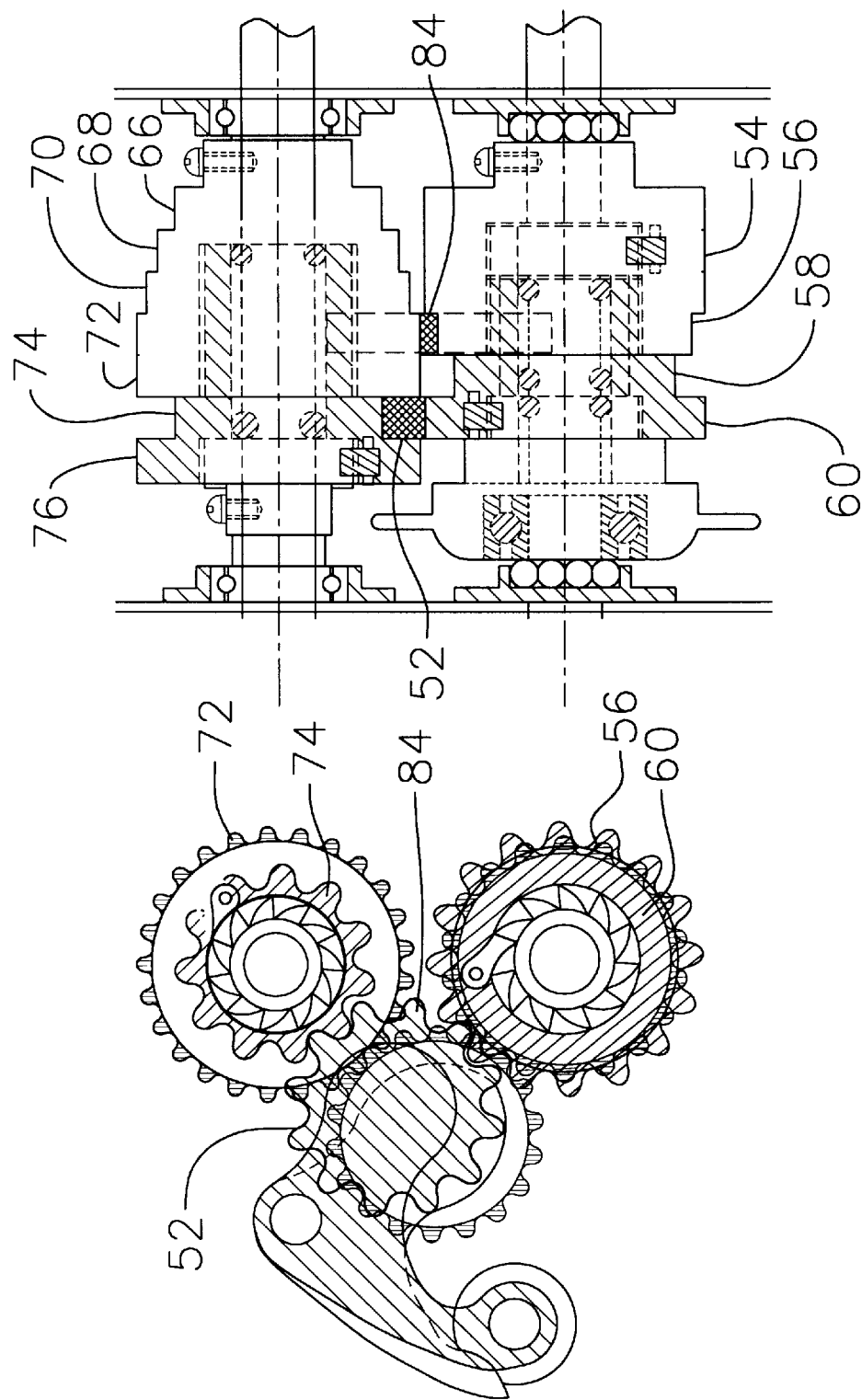

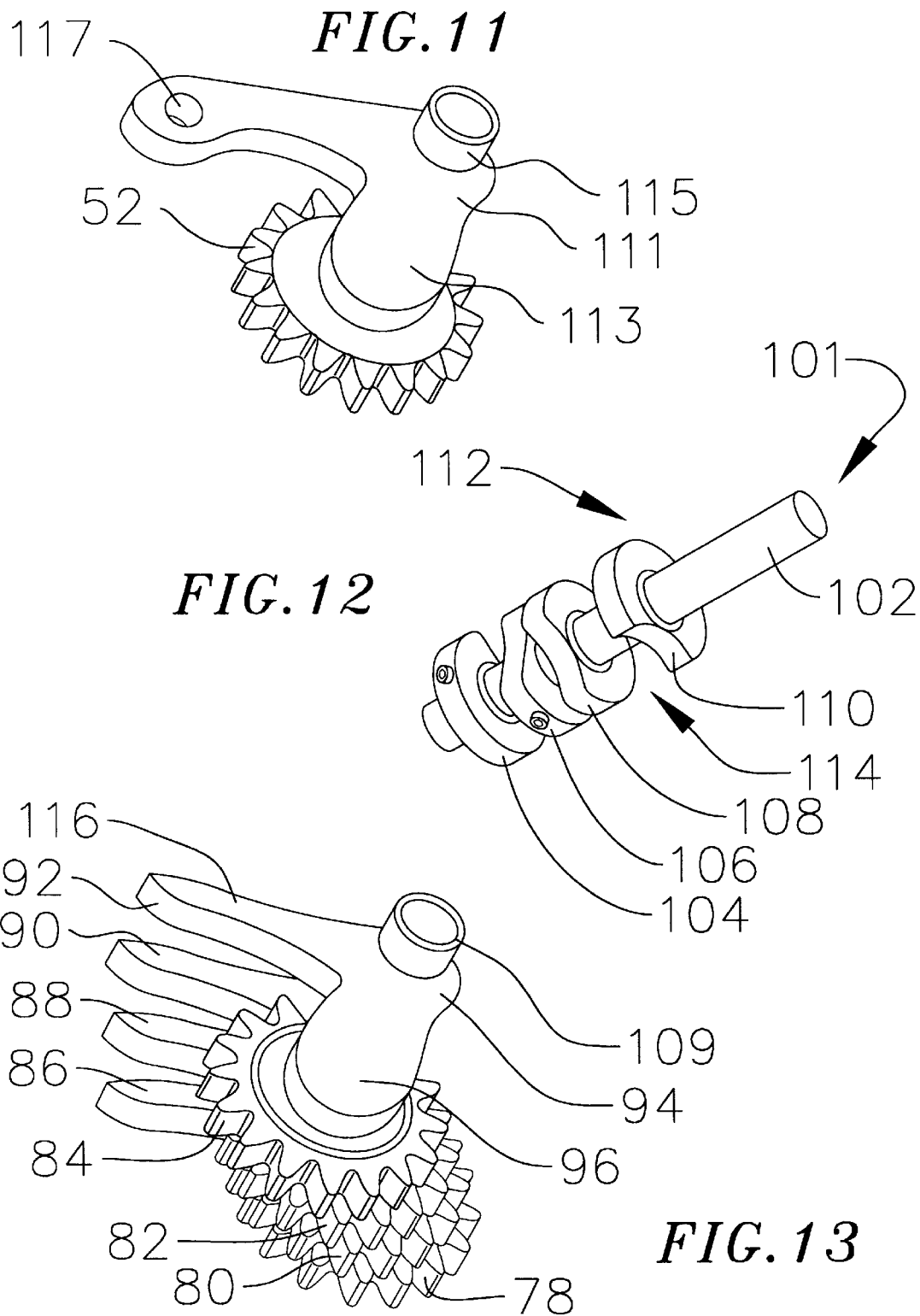

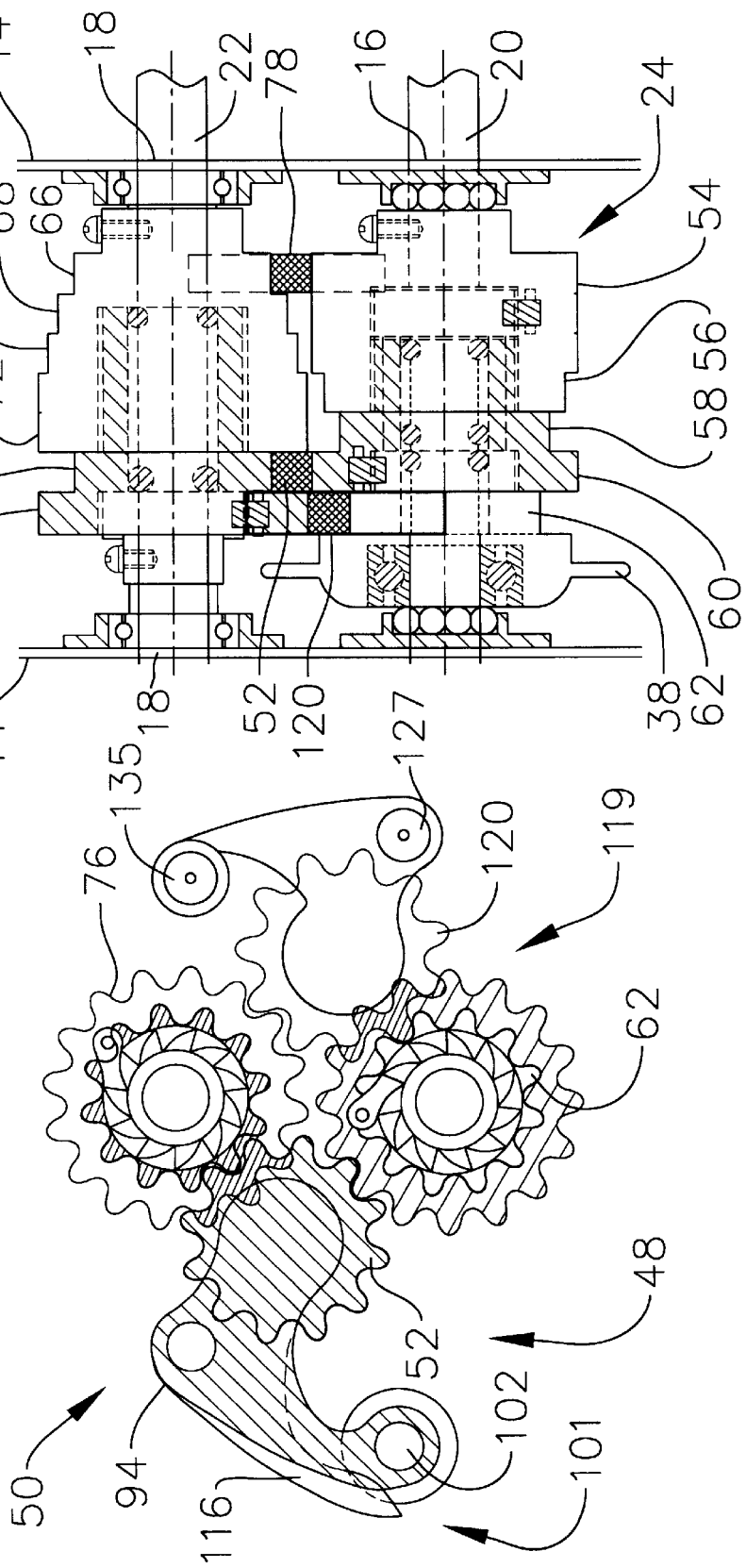

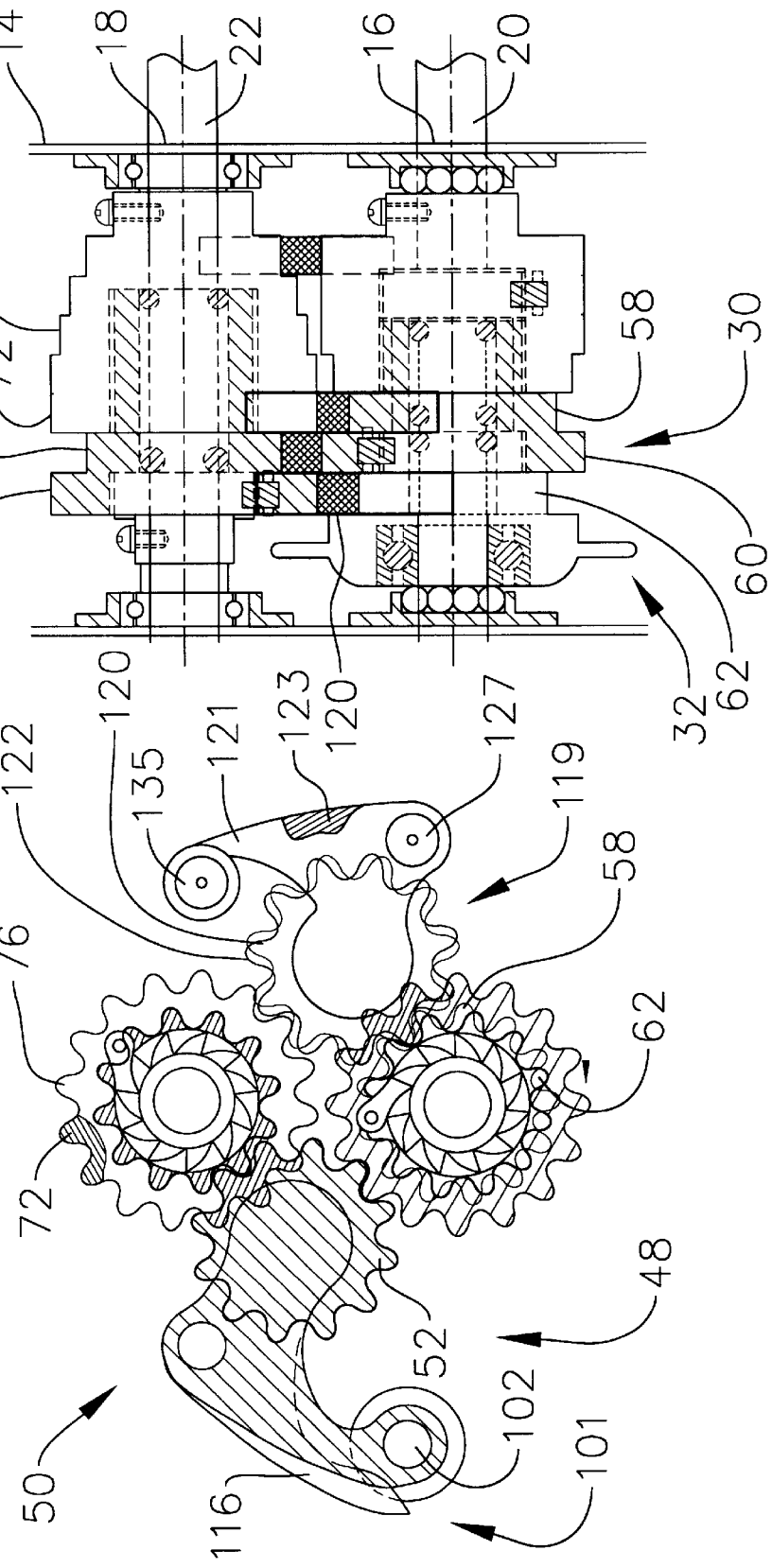

BICYCLE TRANSMISSION WITH SELECTABLE AUTOMATIC DOWN SHIFTING

FIELD OF THE INVENTION

The present invention relates generally to bicycle transmissions, and in particular to multi-speed bicycle transmissions.

BACKGROUND OF THE INVENTION

Bicycles have been used for transportation for many years. Recently, bicycles have been increasingly utilized for exercise and health reasons. Further, there are many different types of bicycles for different purposes such as racing, traversing unpaved train and touring.

Many bicycles include multi-speed transmissions to enhance their operational over different types of train. Existing bicycle transmissions are generally derailleur type manually controlled by a cable connected to a shift lever. Moving the shift gear changes the cable tension and moves the derailleur and a drive chain from one gear to another gear. With different gearing ratios, different pedaling effort and speeds can be accomplished.

A disadvantage of existing transmissions is lack of a mechanism for automatically shifting the transmission to reduce the pedaling effort when the bicycle is slowed due to breaking by a rider. This is particularly problematic in cases where before stopping the bicycle transmission has been shifted for high speed travel. Then when the rider stops, the rider must exert a large amount of pedaling force to start the bicycle moving again. An automatic downshifting a mechanism would relieve the rider of having to remember to shift the transmission for reducing the pedal effort when the rider slows the bicycle under breaking action.

There is therefore a need for a multi-speed transmission for a bicycle which provides automatic downshifting when the user applies the bicycle breaks.

BRIEF SUMMARY OF THE INVENTION

The present invention satisfies these needs. In one embodiment the present invention provides a multi-speed transmission for bicycles, comprising: (a) a housing including spaced, opposing face plates, each face plate having a pedal shaft opening and a secondary shaft opening; (b) a pedal shaft rotatably disposed within said pedal shaft openings; (c) a secondary shaft disposed within said secondary shaft openings, wherein the secondary shaft is spaced from the pedal shaft and substantially parallel thereto; (d) a pedal shaft set of gears mounted on the pedal shaft between the face plates, comprising: (1) a first set of pedal shaft gears mounted on the pedal shaft (2) a second set of pedal shaft gears rotatably mounted on the pedal shaft, and (3) a third set of pedal shaft gears rotatably mounted on the pedal shaft including first means for selective driving engagement with the second set of pedal shaft gears, the third set of pedal shaft gears including a drive gear means; (e) a secondary shaft set of gears mounted on the secondary shaft between the face plates, comprising: (1) a first set of secondary shaft gears mounted on the secondary shaft, and (2) a second set of secondary shaft gears rotatably mounted on the secondary shaft including second means for selective driving engagement with the first set of secondary shaft gears; (f) a primary set of pinion gears rotatably attached to means for selectively engaging each pinion gear between the first set of pedal shaft gears and the first set of secondary shaft gears; and (g) a permanent pinion gear engaged between the second set of pedal shaft gears and the second set of secondary shaft gears.

In operation, when one of the primary pinion gears is engaged between the first set of pedal shaft gears and the first set of secondary shaft gears, applying rotary torque to the pedal shaft causes: (1) the first set of pedal shaft gears to rotate the first set of secondary shaft gears via the engaged primary pinion gear, (2) the first set of secondary shaft gears rotate the second set of secondary shaft gears, (3) the second set of secondary shaft gears rotate the second set of pedal shaft gears via the permanent pinion gear, and (4) the second set of pedal shaft gears rotate the third set of pedal shaft gears including said drive gear means.

The multi-speed transmission further comprises a set of auxiliary pinion gears including: (a) a first pinion gear rotatably attached to first engagement means for selectively engaging the first pinion gear between the first set of secondary shaft gears and the second set of pedal shaft gears; and (b) a second pinion gear rotatably attached to second engagement means for selectively engaging the second pinion gear between the second set of secondary shaft gears and the third set of pedal shaft gears.

The multi-speed transmission can further include pinion gear selection means controlling said first and second engagements, the pinion gear selection means having: (i) a first control position whereby the first and the second auxiliary pinion gears are engaged, (ii) a second control position whereby the first and the second auxiliary pinion gears are disengaged, and (iii) a third control position whereby the first auxiliary pinion gear is disengaged, and the second auxiliary pinion gear is engaged.

In the third control position, the second auxiliary pinion gear is engaged between the third set of pedal shaft gears and the second set of secondary shaft gears, such that applying rotary torque to the pedal shaft causes: (1) the first set of pedal shaft gears to rotate the first set of secondary shaft gears via an engaged pinion gear, (2) the first set of secondary shaft gears rotate the second set of secondary shaft gears, and (3) the second set of secondary shaft gears rotate the third set of pedal shaft gears via the second auxiliary pinion gears including said drive gear means.

In the first control position the second auxiliary pinion gear is engaged between the third set of pedal shaft gears and the second set of secondary shaft gears, and the first auxiliary pinion gear is engaged between the first set of secondary shaft gears and the second set of the pedal shaft gears, such that applying rotary torque to the pedal shaft causes: (1) the first set of pedal shaft gears to rotate the first set of secondary shaft gears via an engaged pinion gear, (2) the first set of secondary shaft gears rotates the second set of pedal shaft gears via the first auxiliary pinion gear, (3) the second set of pedal shaft gears rotates the second set of secondary shaft gears via the permanent gear, (4) the second set of secondary shaft gears rotates the third set of the pedal shaft gears via the second auxiliary pinion gear, thereby rotating said drive gear means.

As such, a bicycle transmission according to the present invention provides multi-speed transmission for a bicycle which can be shifted while the bicycle is stationary and while breaking. The transmission requires infrequent maintenance without premature wear and tear. Further, the transmission provides for changing gears without slipping of the gears or the drive chain. This feature also reduces gear change noise, and increases the life of the drive chain.

BRIEF DESCRIPTION OF THE DRAWINGS

These and other features, aspects and advantages of the present invention will become better understood with regard to the following description, appended claims and accompanying drawings where:

FIG. 7 shows the transmission of FIG. 1 wherein another pinion gear is engaged; and FIG. 8 shows a schematic front elevation view, partially cut away and sectioned, of the transmission of FIG. 7.

FIG. 11 shows a perspective view of a primary pinion gear and corresponding engagement means in transmission of FIG. 1;

FIG. 12 shows a perspective view of a cam mechanism cooperating with the engagement means of the primary pinion gears in transmission of FIG. 1;

FIG. 13 is a perspective view of the primary pinion gears in transmission of FIG. 1;

FIG. 16 shows a schematic side elevation view of another embodiment of a multi-speed transmission according to the present invention, wherein an auxiliary pinion gear is engaged;

FIG. 17 shows a schematic front elevation view, partially cut away and sectioned, of the transmission of FIG. 16;

FIG. 18 shows a schematic side elevation view of another embodiment of a multi-speed transmission according to the present invention, wherein two auxiliary pinion gear is engaged;

FIG. 19 shows a schematic front elevation view, partially cut away and sectioned, of the transmission of FIG. 18;

DETAILED DESCRIPTION OF THE INVENTION

Figure 2:
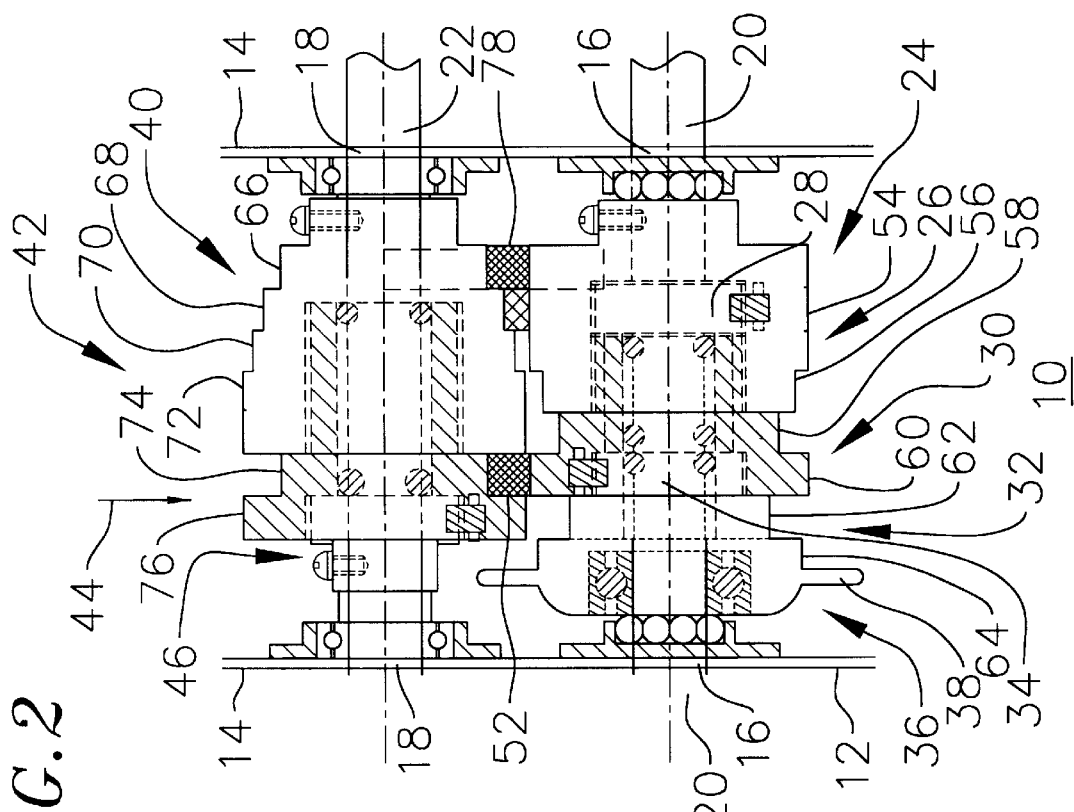
FIG. 2 shows a schematic front elevation view, partially cut away and sectioned, of the transmission of FIG. 1.

Referring FIG. 1–15, in a preferred embodiment a multi-speed bicycle transmission 10 according to the present invention comprises a housing 12 including spaced, opposing face plates 14, with each face plate 14 having a pedal shaft opening 16 and a secondary shaft opening 18. A pedal shaft 20 is rotatably disposed within the pedal shaft openings 16 of the face plates 14, and a secondary shaft 22 is disposed within the secondary shaft openings 18. As such, the secondary shaft 22 is spaced from, and parallel to, the pedal shaft 20.

A pedal shaft set of gears 24 are mounted on the pedal shaft 20 between the face plates 14. The pedal shaft set of gears 24 include: (1) a first set of pedal shaft gears 26 mounted on the pedal shaft 20, (2) a second set of pedal shaft gears 30 rotatably mounted on the pedal shaft 20, and (3) a third set of pedal shaft gears 32 rotatably mounted on the pedal shaft 20 including first means 34 for selective driving engagement with the second set of pedal shaft gears 30. The third set of pedal shaft gears 32 including a drive gear means 36 such as a sprocket 38 for engaging a drive chain.

A secondary shaft set of gears 40 are mounted on the secondary shaft 22 between the face plates 14. The secondary shaft set of gears 40 include: (1) a first set of secondary shaft gears 42 mounted on the secondary shaft 22, and (2) a second set of secondary shaft gears 44 rotatably mounted on the secondary shaft 22 including second means 46 for selective driving engagement with the first set of secondary shaft gears 42. Further, a set of primary pinion gears 48 are rotatably attached to a means 50 for selectively engaging each pinion gear 48 between the first set of pedal shaft gears 26 and the first set of secondary shaft gears 40. A permanent pinion gear 52 is engaged between the second set of pedal shaft gears 30 and the second set of secondary shaft gears 44. The transmission 10 can further include third means 28 for selective driving engagement of the first set of pedal shaft gears 26 with the pedal shaft 20.

As shown in FIG. 11, the permanent gear 52 is rotatably attached to a distal end 113 of a support arm 111. The support arm 111 includes openings 115 and 117 corresponding to the member 109 and the shaft 102, respectively, for fixedly attaching the support arm 111 to the housing 12 via the member 109 and the shaft 102 as illustrated in FIG. 11.

When one of the primary pinion gears 48 is engaged between the first set of pedal shaft gears 26 and the first set of secondary shaft gears 42, applying forward rotary torque to the pedal shaft 20 causes: (1) the first set of pedal shaft gears 26 to rotate the first set of secondary shaft gears 42 via the engaged primary pinion gear 48, (2) the first set of secondary shaft gears 42 rotate the second set of secondary shaft gears 44, (3) the second set of secondary shaft gears 44 rotate the second set of pedal shaft gears 30 via the permanent pinion gear 52, and (4) the second set of pedal shaft gears 30 rotate the third set of pedal shaft gears 32 including said drive gear means 34. The drive gear means 36 can include a pedal drive sprocket 38 for engaging and driving drive chain means connectable to a rear drive wheel of a bicycle.

In the embodiment of the invention shown in the drawings, the first set of pedal shaft gears 26 comprises two integral gears 54, 56 having different gearing ratios. For example, the gear 54 has 24 teeth and the gear 56 has 22 teeth. The second set of pedal shaft gears 30 comprises two integral gears 58, 60 having different gearing ratios. The gear 58 has 18 teeth and the gear 60 has 24 teeth. The third set of pedal shaft gears 32 comprises two integral gears 62, 64 having different gearing ratios. The gear 62 has 16 teeth and the gear 64 can comprise the sprocket 38 and have 16 or 18 teeth. The first set of secondary shaft gears 42 comprises four integral gears 66, 68, 70, 72 having different gearing ratios. The gear 66 has 16 teeth, the gear 68 has 19 teeth, the gear 70 has 22 teeth and the gear 72 has 24 teeth. The second set of secondary shaft gears 44 comprises two integral gears 74, 76 having different gearing ratios. The gear 74 has 16 teeth and the gear 76 has 24 teeth. Further the permanent pinion gear 52 has 18 teeth.

The primary pinion gears 48 include four pinion gears 78, 80, 82, 84 which can have different gearing ratios. In one example, the pinion gear 78 has 18 teeth, the pinion gear 80 has 18 teeth, the pinion gear 82 has 18 teeth and the pinion gear 84 has 18 teeth. The means 50 for selectively engaging the primary pinion gears 48 comprises a set of four spring loaded arms 86, 88, 90, 92 corresponding to the pinion gears 78, 80, 82, 84, respectively, wherein each of the arms 86, 88, 90, 92 has a proximal end 94 pivotally attached to the housing 12 via a member 109, and a distal end 96 to which one of the corresponding pinion gears 78, 80, 82, 84 is rotatably attached. Each of the arms 86, 88, 90, 92 has a first pivot position where one of a corresponding pinion gears 78, 80, 82, 84 is engaged as described above, and a second pivot position where one of a corresponding pinion-gears 78, 80, 82, 84 is disengaged.

Referring specifically to FIGS. 1–9, 12, 14, 15, a cam shaft 102 is rotatably attached between the two face plates 14. A set of cams 101, comprising four cams 104, 106, 108, 110 are mounted on the cam shaft 102, wherein the four cam 104, 106, 108, 100 correspond to said four arms 86, 88, 90, 92, respectively. Each of the cams 104, 106, 108, 110 comprises a disk 112 with a perimeter depression 114, wherein an extension portion 116 of the proximal end 94 of one of a corresponding arms 86, 88, 90, 92 is urged on the perimeter of the disk 112 by the spring loaded arm. For each of the arms 86, 88, 90, 92, when the extension portion 116 engages the depression 114 of the disk 112, the arm is pivoted to the second pivot position where the corresponding pinion gear attached to the arm is disengaged, otherwise, the arm is pivoted to the first pivot position where the pinion gear is engaged. The depressions 114 on the cams 104, 106, 108, 110 are out of phase, such that as the cam shaft 102 rotates, only the extension portion 116 of one arm engages a corresponding cam's depression 114 at a time, whereby only one of the pinion gears 78, 80, 82, 84 is selected at a time. The camshaft 102 can be rotated for selectively engaging the pinion gears 78, 80, 82, 84 via a cable operated pulley 118 mounted on the cam shaft 102.

Figure 1:
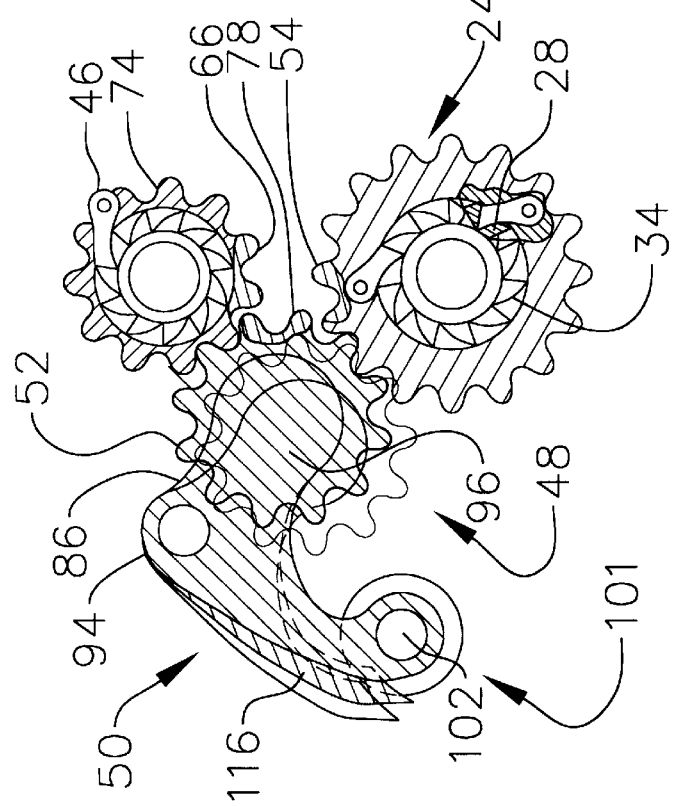
FIG. 1 shows a schematic side elevation view of an embodiment of a multi-speed transmission according to the present invention, wherein a primary pinion gear is engaged.

Referring specifically to FIGS. 1–2, when the first primary pinion gear 78 is selected, the first primary pinion gear 78 is engaged between the gear 54 of the first set of pedal shaft gears 26 and the gear 66 of the first set of secondary shaft gears 42. Applying forward rotary torque to the pedal shaft 20 causes: (1) the gear 54 of the first set of pedal shaft gears 26 to rotate the gear 66 of the first set of secondary shaft gears 42 via the engaged primary pinion gear 40 78, (2) the first set of secondary shaft gears 42 rotates the second set of secondary shaft gears 44, (3) the gear 74 of the second set of secondary shaft gears 42 rotates the gear 60 of the second set of pedal shaft gears 30 via the permanent pinion gear 52, and (4) the second set of pedal shaft gears 30 rotates the gear 62 of the third set of pedal shaft gears 32 including said drive gear means 36.

Figure 4:
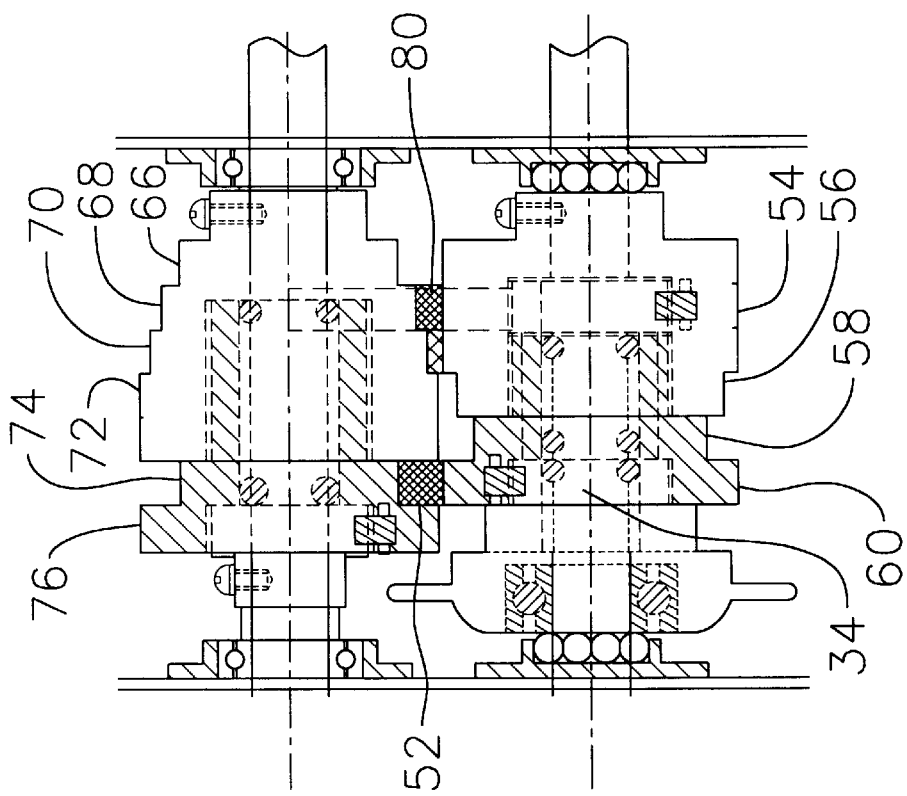
FIG. 4 shows a schematic front elevation view, partially cut away and sectioned, of the transmission of FIG. 3.
Figure 3:
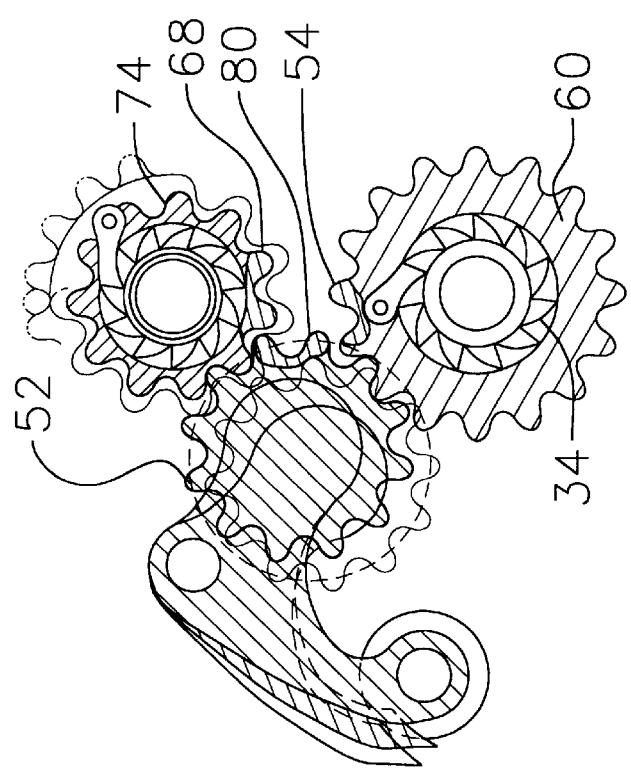
FIG. 3 shows the transmission of FIG. 1 wherein another primary pinion gear is engaged.

Referring specifically to FIGS. 3–4, when the second primary pinion gear 80 is selected, the second primary pinion gear 80 is engaged between the gear 54 of the first set of pedal shaft gears 26 and the gear 68 of the first set of secondary shaft gears 42. Applying forward rotary torque to the pedal shaft 20 causes: (1) the gear 54 of the first set of pedal shaft gears 26 to rotate the gear 68 of the first set of secondary shaft gears 42 via the engaged primary pinion gear 80, (2) the first set of secondary shaft gears 42 rotates the second set of secondary shaft gears 44, (3) the gear 74 of the second set of secondary shaft gears 44 rotates the gear 60 of the second set of pedal shaft gears 30 via the permanent pinion gear 52, and (4) the second set of pedal shaft gears 30 rotates the third set of pedal shaft gears 32 including said drive gear means 36.

Figure 6:
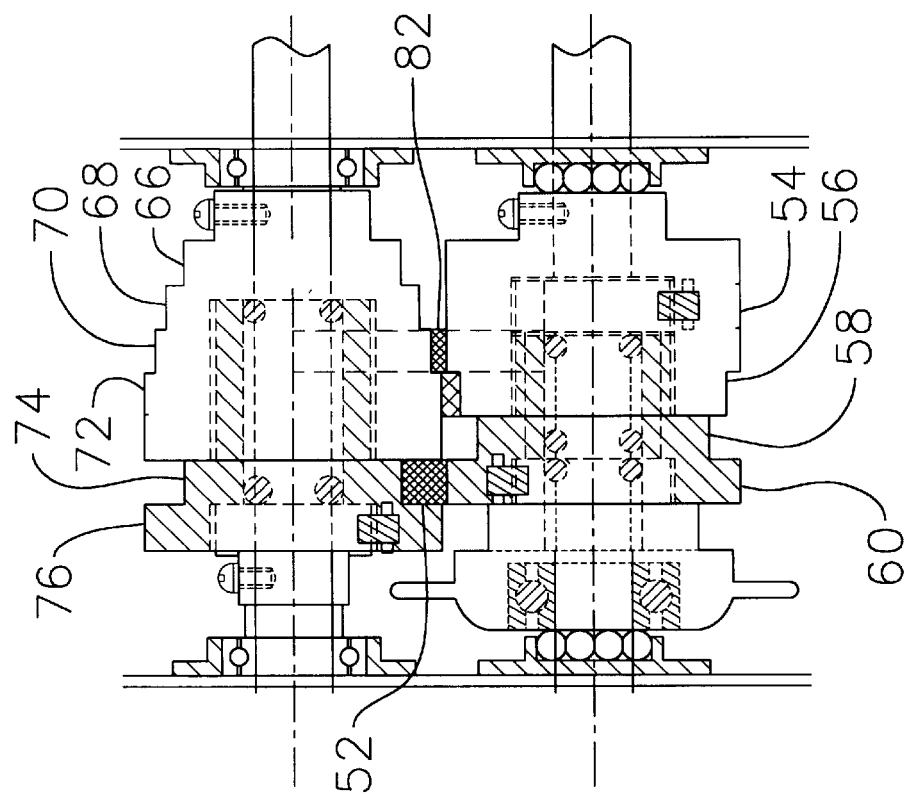
FIG. 6 shows a schematic front elevation view, partially cut away and sectioned, of the transmission of FIG. 5.
Figure 5:
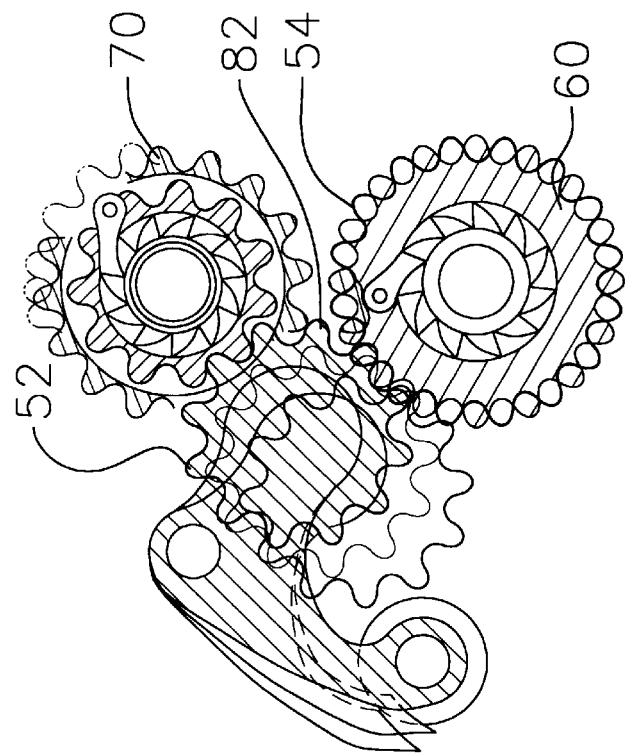
FIG. 5 shows the transmission of FIG. 1 wherein another primary pinion gear is engaged.
Figure 9:
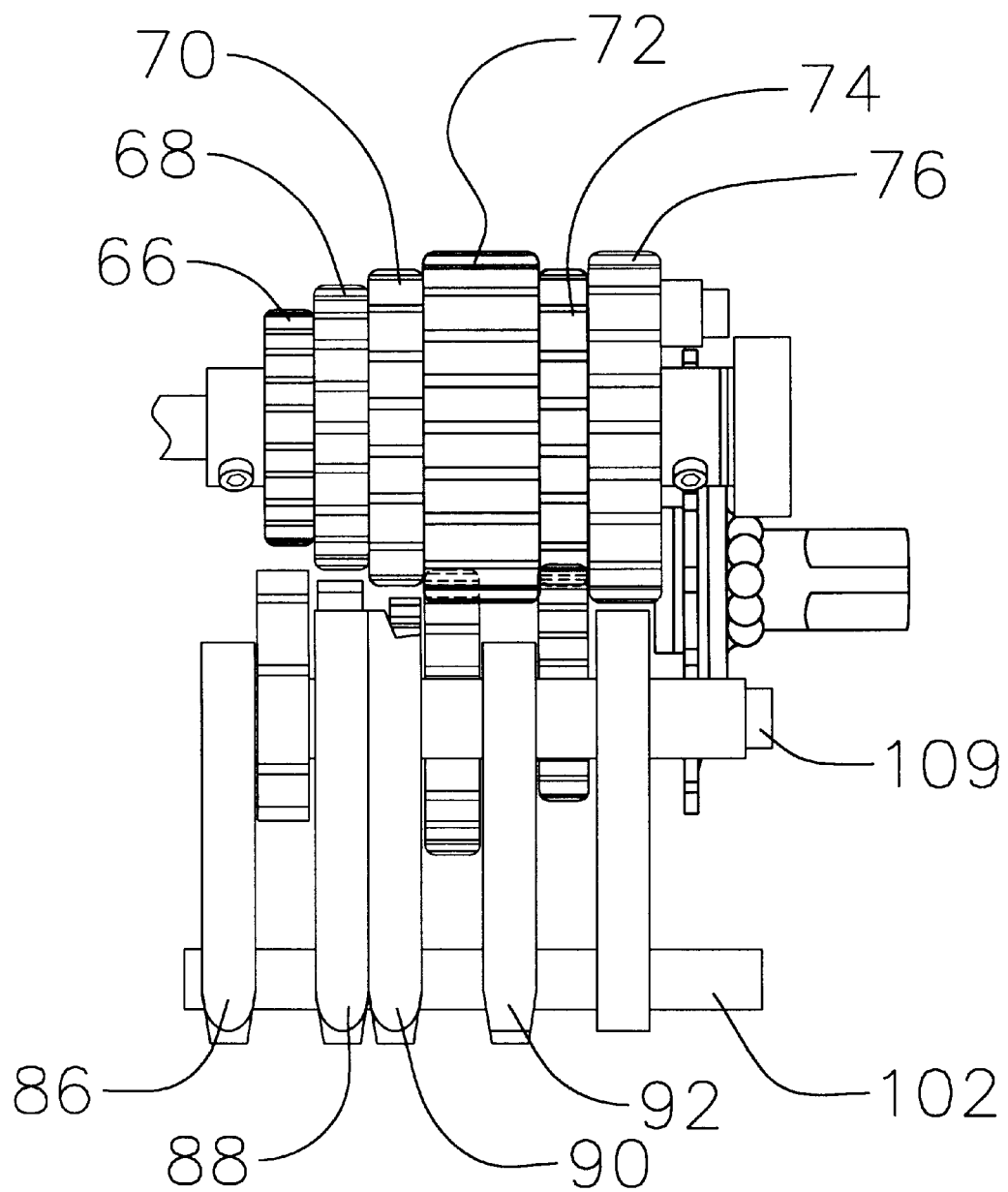
FIG. 9 shows a partial perspective view of the transmission of FIG. 1 illustrating gear engagement means for the primary pinion gears.

Referring specifically to FIGS. 5–6, when the third primary pinion gear 82 is selected, the third primary pinion gear 82 is engaged between the gear 54 of the first set of pedal shaft gears 26 and the gear 70 of the first set of secondary shaft gears 42. Applying forward rotary torque to the pedal shaft 20 causes: (1) the gear 54 of the first set of pedal shaft gears 26 to rotate the gear 70 of the first set of secondary shaft gears 42 via the engaged primary pinion gear 82, (2) the first set of secondary shaft gears 42 rotates the second set of secondary shaft gears 44, (3) the gear 74 of the second set of secondary shaft gears 44 rotates the gear 60 of the second set of pedal shaft gears 30 via the permanent pinion gear 52, and (4) the second set of pedal shaft gears 30 rotates the third set of pedal shaft gears 32 including said drive gear means 36.

And, referring specifically to FIGS. 7–8, when the fourth primary pinion gear 84 is selected, the fourth primary pinion gear 84 is engaged between the gear 56 of the first set of pedal shaft gears 26 and the gear 72 of the first set of secondary shaft gears 42. Applying forward rotary torque to the pedal shaft 20 causes: (1) the gear 54 of the first set of pedal shaft gears 26 to rotate the gear 72 of the first set of secondary shaft gears 42 via the engaged primary pinion gear 84, (2) the first set of secondary shaft gears 42 rotates the second set of secondary shaft gears 44, (3) the gear 74 of the second set of secondary shaft gears 44 rotates the gear 60 of the second set of pedal shaft gears 30 via the permanent pinion gear 52, and (4) the second set of pedal shaft gears 30 rotates the third set of pedal shaft gears 32 including said drive gear means 36.

The required pedaling effort decreases as each of the primary pinion gears 78, 80, 82, and 84 are is individually engaged in turn. As such, the required pedaling effort when the pinion gear 78 is engaged is higher than when pinion gear 80 is engaged. When the pinion gear 80 is engaged, the required pedaling effort is higher than when the pinion gear 82 is engaged. And, when the pinion gear 82 engaged, the pedaling effort is higher than when the pinion gear 84 is engaged. A higher pedaling effort provides more speed for the bike, and a lower pedaling effort provides less speed for the bike. Typically higher pedaling effort is selected for higher bike speed on level or down hill roads, where as lower pedaling effort is selected for lower bike speed on uphill roads.

The first means 28 for selective driving engagement of the first set of pedal shaft gears 26 with the pedal shaft 20 comprises pawl means effectively subject to compressive stress only during forward rotative displacement of the pedal shaft 20. The second means 34 for selective driving engagement of the third set of pedal shaft gears 32 with the second set of pedal shaft gears 30 comprises pawl means effectively subject to compressive stress only during forward rotative displacement of the pedal shaft 20. And, the third means 46 for selective driving engagement of the second set of secondary shaft gears 44 with the first set of secondary shaft gears 42 comprises pawl means effectively subject to compressive stress only during forward rotative displacement of the pedal shaft 20. Said pawls means are well known by the practitioners in the art and so are not described herein.

Referring to FIGS. 16–26, the transmission 10 further comprises a set of auxiliary pinion gears 119 including a first pinion gear 122 rotatably attached to first engagement means 123 for selectively engaging the first pinion gear 122 between the first set of secondary shaft gears 42 and the second set of pedal shaft gears 30. The auxiliary gears 119 further includes a second pinion gear 120 rotatably attached to second engagement means 121 for selectively engaging the second pinion gear 120 between the second set of secondary shaft gears 44 and the third set of pedal shaft gears 32. The first and second pinion gears 122 and 120 can be of the same or different size and/or gearing rations.

Referring specifically to FIGS. 16–19, 21, 22, 24, 25 and 26, in one embodiment, the first engagement means 123 comprises a spring loaded arm having a proximal end 125 pivotally attached to the housing via a member 127, and a distal end 129 to which the first auxiliary pinion gear 122 is rotatably attached, said arm having a first pivot position where the first auxiliary pinion gear 122 is engaged, and a second pivot position where the first auxiliary pinion gear 122 is disengaged. Further, the second engagement means 121 comprises a similar spring loaded arm having a proximal end pivotally attached to the housing, and a distal end to which the second auxiliary pinion 120 gear is rotatably attached, said arm having a first pivot position where the second auxiliary pinion gear 120 is engaged, and a second pivot position where the second auxiliary pinion gear 120 is disengaged.

Referring specifically to FIGS. 21–26, the transmission 10 can further comprises a pinion gear selection means 133 for controlling said first and second engagement means, the pinion gear selection means 133 having: (i) a first control position whereby the first and the second auxiliary pinion gears 122, 120 are engaged, (ii) a second control position whereby the first and the second auxiliary pinion gears 122, 120 are disengaged, and (iii) a third control position whereby the first auxiliary pinion gear 122 is disengaged, and the second auxiliary pinion gear 120 is engaged.

In one embodiment, the pinion gear selection means 133 comprises a cam shaft 135 rotatably attached between the two face plates 14. Two cams 137, 139 are mounted on the cam shaft 135, wherein the two cams 137, 139 correspond to said two arms 123, 121, respectively. Each of the cams 137, 139 comprises a partial disk 140 with a perimeter depression 142, wherein an extension portion 144 of the proximal end 144 of one of a corresponding arms 123, 121, is urged on the perimeter of the disk 140 by the spring loaded arm. For each of the arms 123, 121, when the extension portion 144 engages the depression 142 of the disk 140, the arm is pivoted to the second pivot position where the corresponding pinion gear attached to the arm is disengaged, otherwise, the arm is pivoted to the first pivot position where the corresponding pinion gear is engaged. The depressions 142 on the cams 137, 139 are phases, such that as the cam shaft 135 rotates: (i) in the first control position the first and the second auxiliary pinion gears 122, 120 are engaged, (ii) in the second control position the first and the second auxiliary pinion gears 122, 120 are disengaged, and (iii) in the third control position the first auxiliary pinion gear 122 is disengaged, and the second auxiliary pinion gear 120 is engaged.

The first engagement means 123 engages the first pinion gear 122 between the gear 72 of the first set of secondary shaft gears 42, and gear 58 of the second set of pedal shaft gears 30. The second engagement means 121 engages the second pinion gear 120 between the gear 76 of the second set of secondary shaft gears 44, and the gear 62 of the third set of pedal shaft gears 32.

Referring specifically to FIGS. 16–17, torque from pedal shaft 20 rotates gear set 26 which applies torque to gear set 42 via pinion gears 42. In the example shown in FIGS. 16–17, the pinion gear 78 is engages between the gears 54 and 42, where torque from pedal shaft to the gear 54 rotates the gear set 42 via the pinion gear 78. Rotation of gear set 42 then rotates gear set 44. The permanent gear 52 is always engaged between the gear set 44 and the gear set 30. Specifically, gear 52 engages between the gear 74 and the gear 60, and transfers torque from the gear 74 of the gear set 44 to the gear 60 of gear set 30, rotating the gear set 30. When the pinion gear 120 engages the gears 76 and 62, torque from the gear 76 rotated the gear 62 via the pinion gear 120, whereby the gear 62 rotates faster than the gear 60. As such, the gear 60 rotates without applying any torque by skipping, and the gear 62 applies torque to, and rotates, the gear 38. With pinion gear 78 engaged, when the pinion gear 120 is engaged, the pedaling effort is increased. This provides higher pedal effort and a higher speed for the bike.

Referring specifically to FIGS. 18–19, torque from pedal shaft 20 rotates gear set 26 which applies torque to gear set 42 via pinion gears 42. In the example shown in FIG. 18–19, the pinion gear 78 is engages between the gears 54 and 42, where torque from pedal shaft to the gear 54 rotates the gear 42 via the pinion gear 78. With the pinion 4:5 gear 122 is engaged between the gear 72 of the gear set 42, and the gear 58 of the gear set 30, torque from the gear 72 rotates the gear 58. Rotation of gear 58 rotates the gear set 30 and therefore rotates the gear 60. Because the permanent gear is engaged between the gear 60 and the gear 74, torque from the gear 60 rotates the gear 74 via the permanent gear 52. Rotation of the gear 74 rotates the gear set 44 and therefore rotates the gear 76. Torque from gear 76 rotates the gear 62 via the pinion gear 120 engaged therebetween. Rotation of the gear 62 rotates the gear set 32 and therefore rotates the gear 38.

Figure 10:
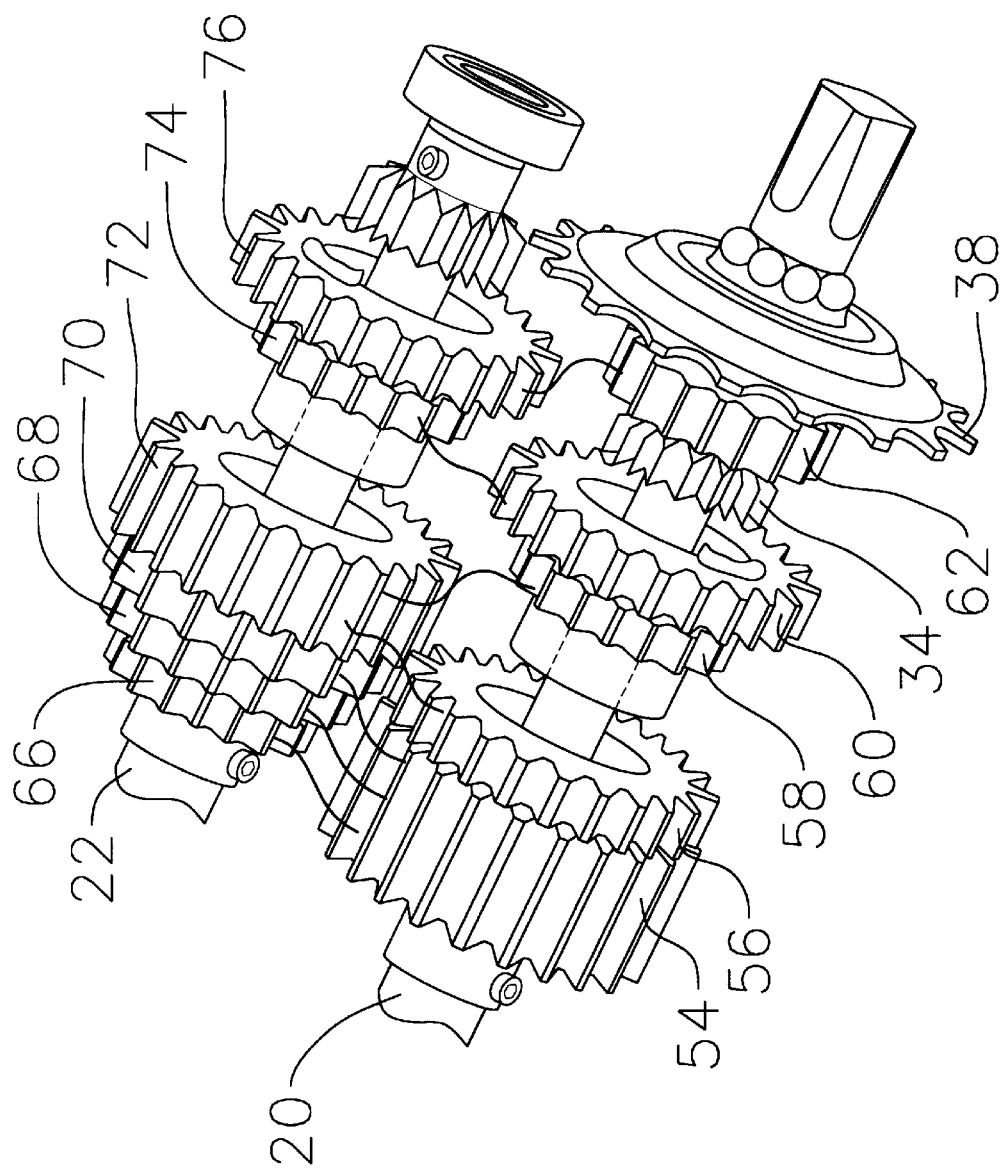
FIG. 10 shows a partial exploded view of the transmission of FIG. 1 illustrating the gear sets.
Figure 14:
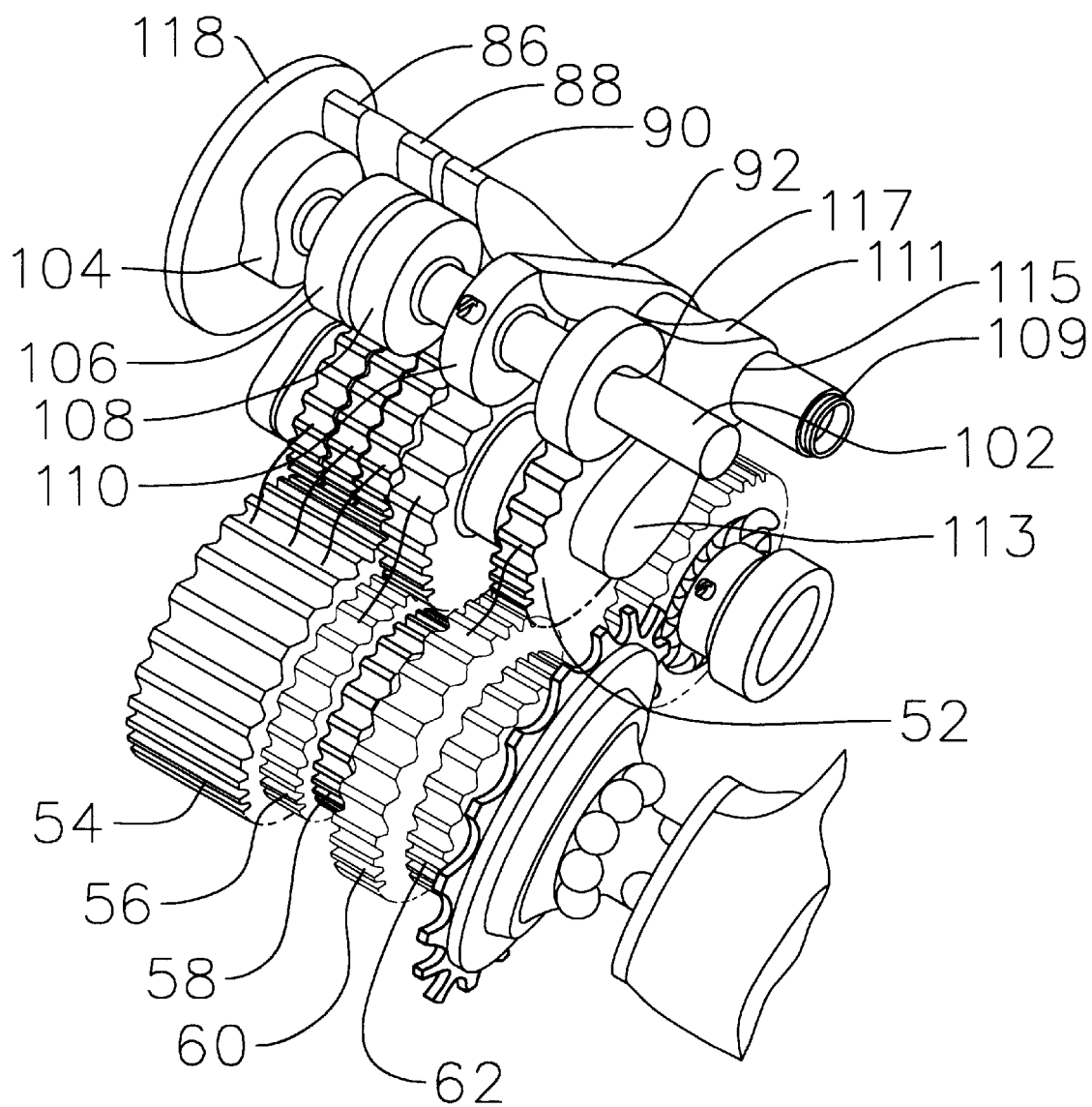
FIG. 14 is a partial perspective view of the gear sets and primary pinion gears with corresponding engagement means and cam mechanism in transmission of FIG. 1.
Figure 15:
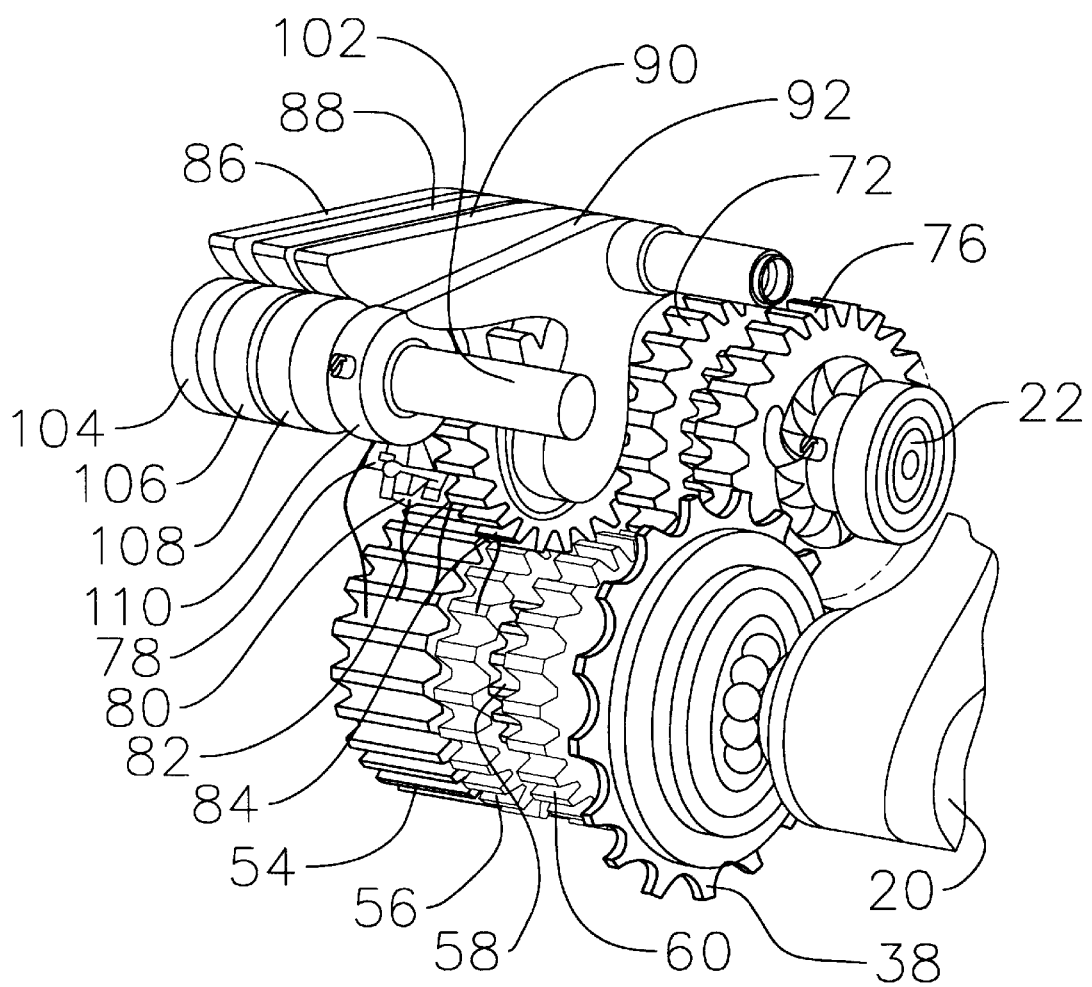
FIG. 15 shows another partial perspective view of the gear sets and primary pinion gears with corresponding engagement means and cam mechanism in transmission of FIG. 1.
Figure 20:
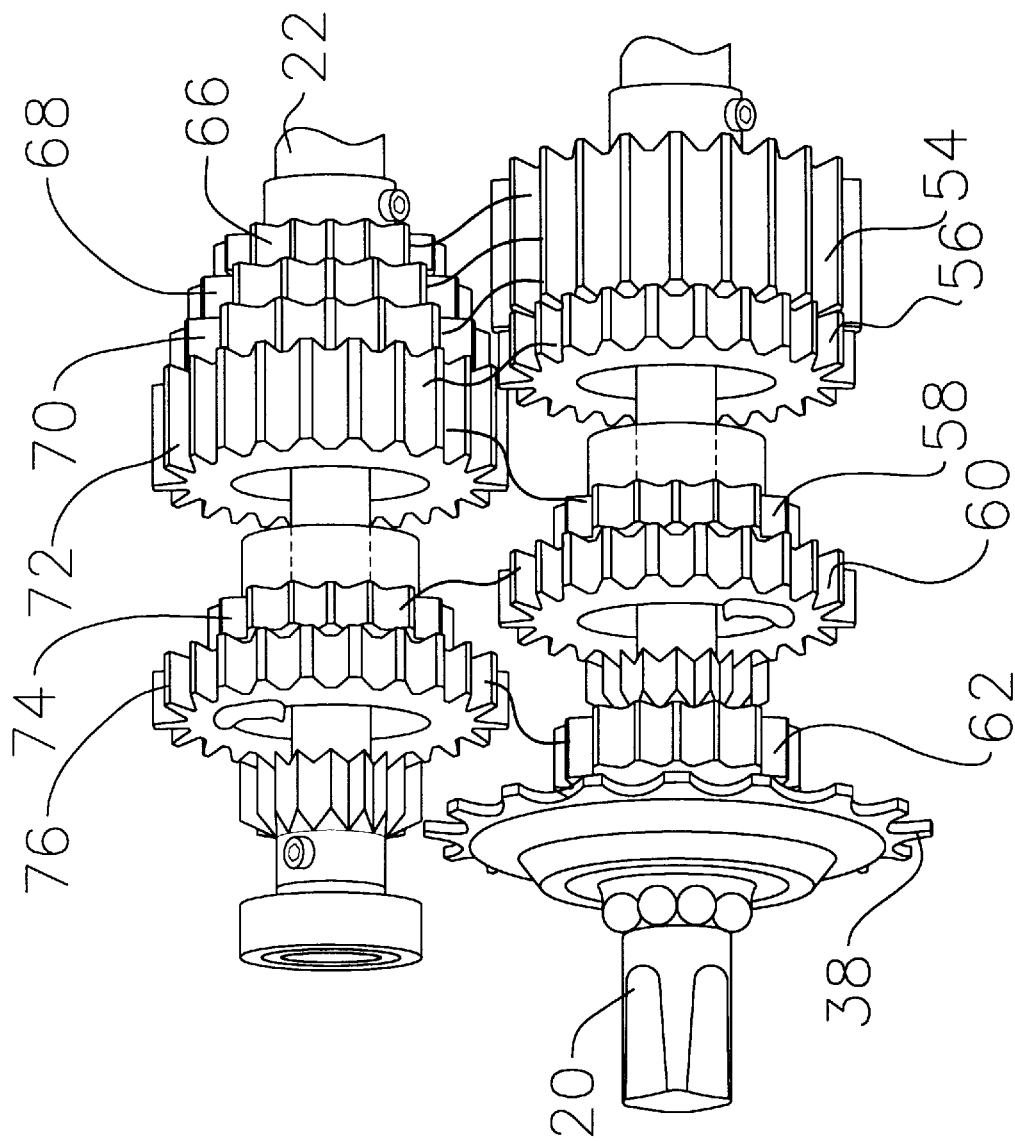
FIG. 20 is a partial perspective view of the transmission of FIG. 16 showing the gear sets.
Figure 21:
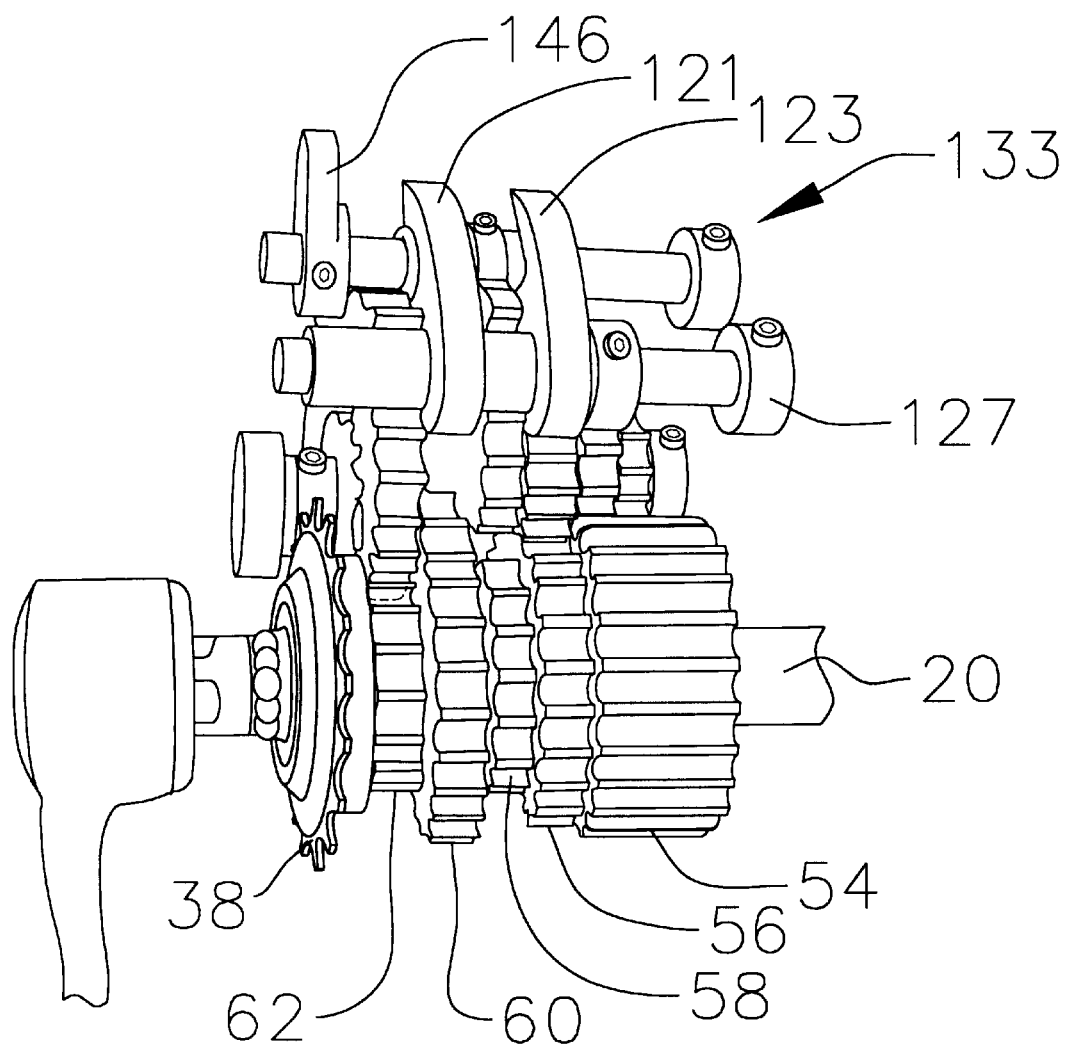
FIG. 21 is a partial perspective view of the transmission of FIG. 16 showing the transmission gears and the auxiliary pinion gear engagement means, wherein neither auxiliary gear is engaged.
Figure 22:
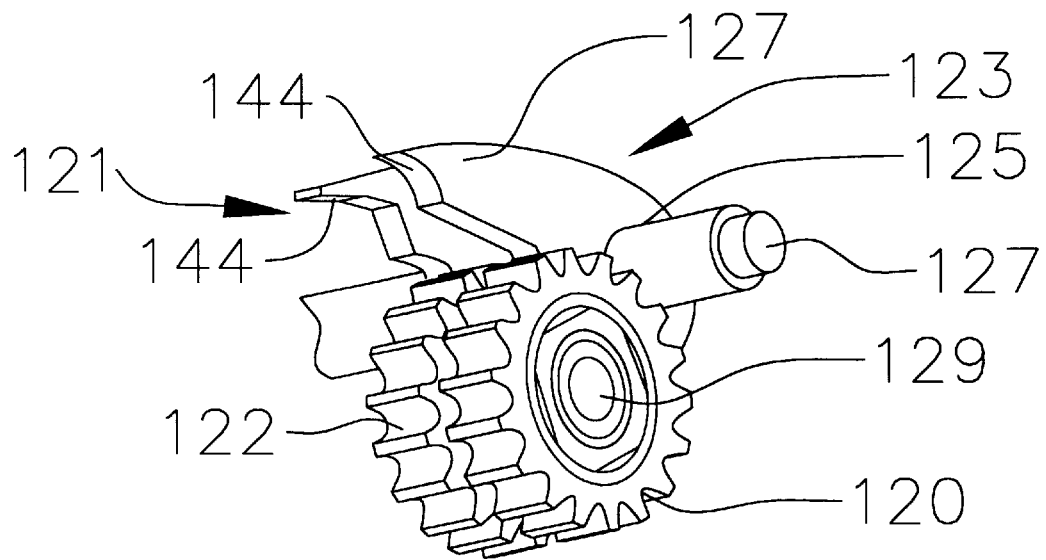
FIG. 22 shows a side perspective view of the auxiliary pinion gears and corresponding support arms.
Figure 23:
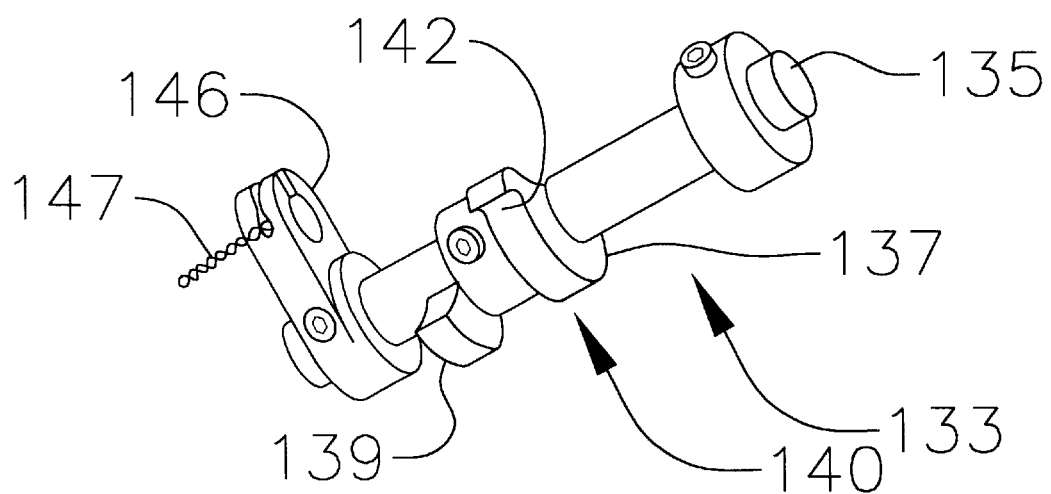
FIG. 23 shows a perspective view of an auxiliary pinion gear selection means in transmission of FIG. 16.
Figure 24:
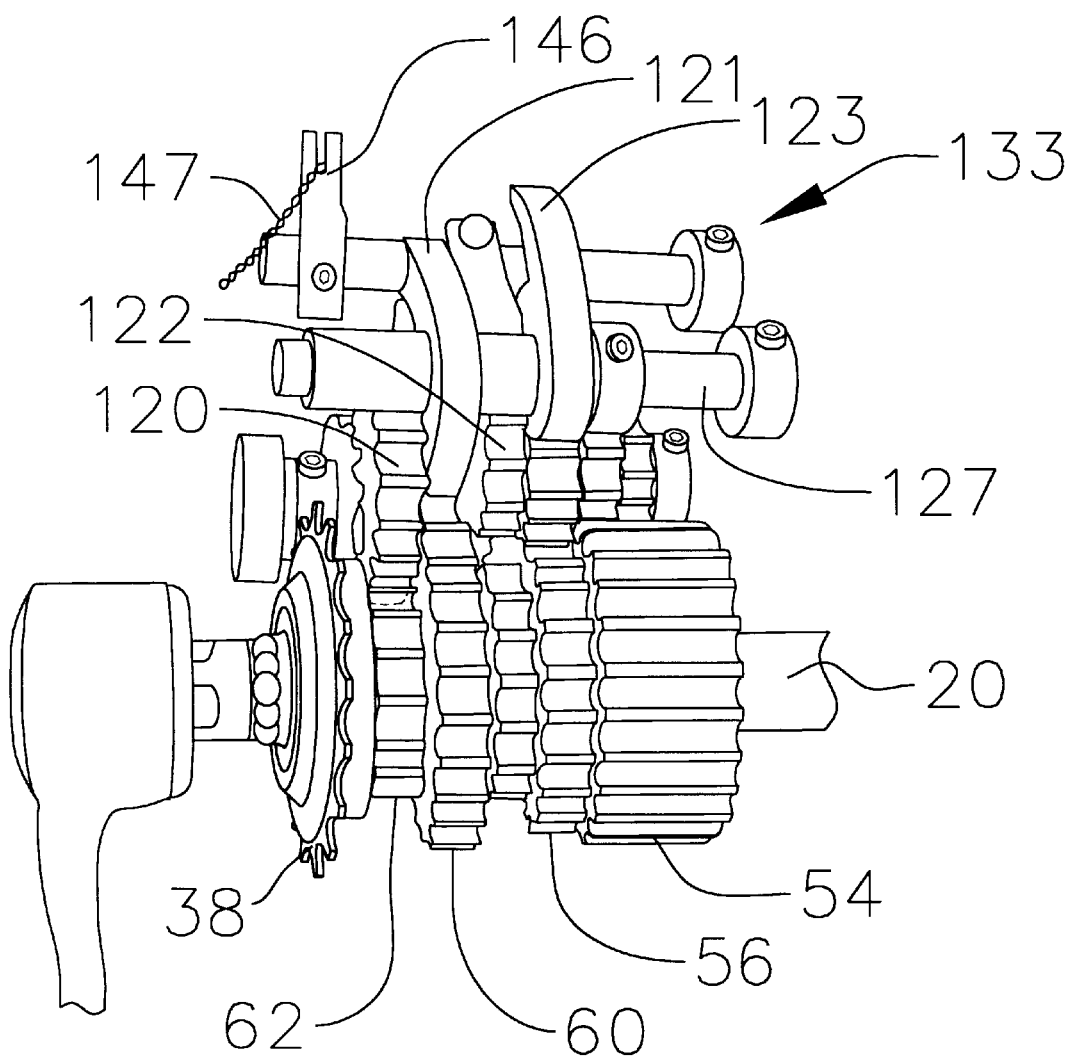
FIG. 24 shows another partial perspective view of the transmission of FIGS. 16–17 wherein one auxiliary pinion gear is selected.
Figure 25:
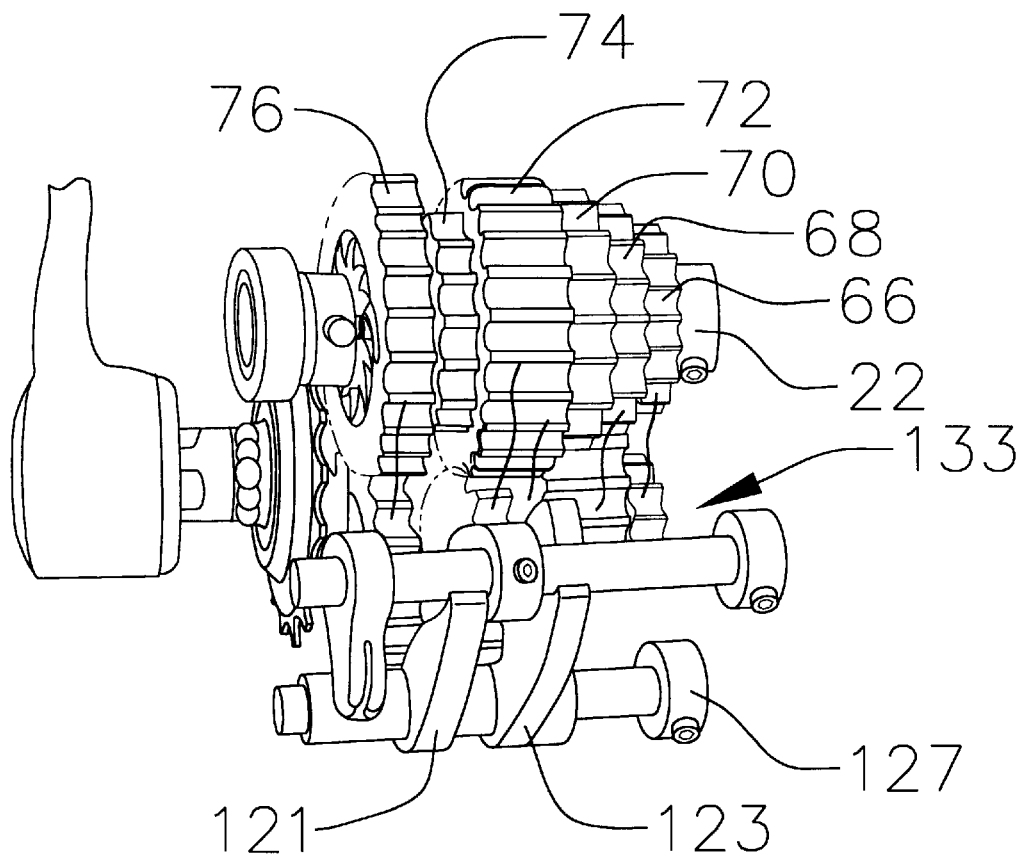
FIG. 25 shows another partial perspective view of the transmission of FIG. 16 illustrating the secondary shaft gears.
Figure 26:
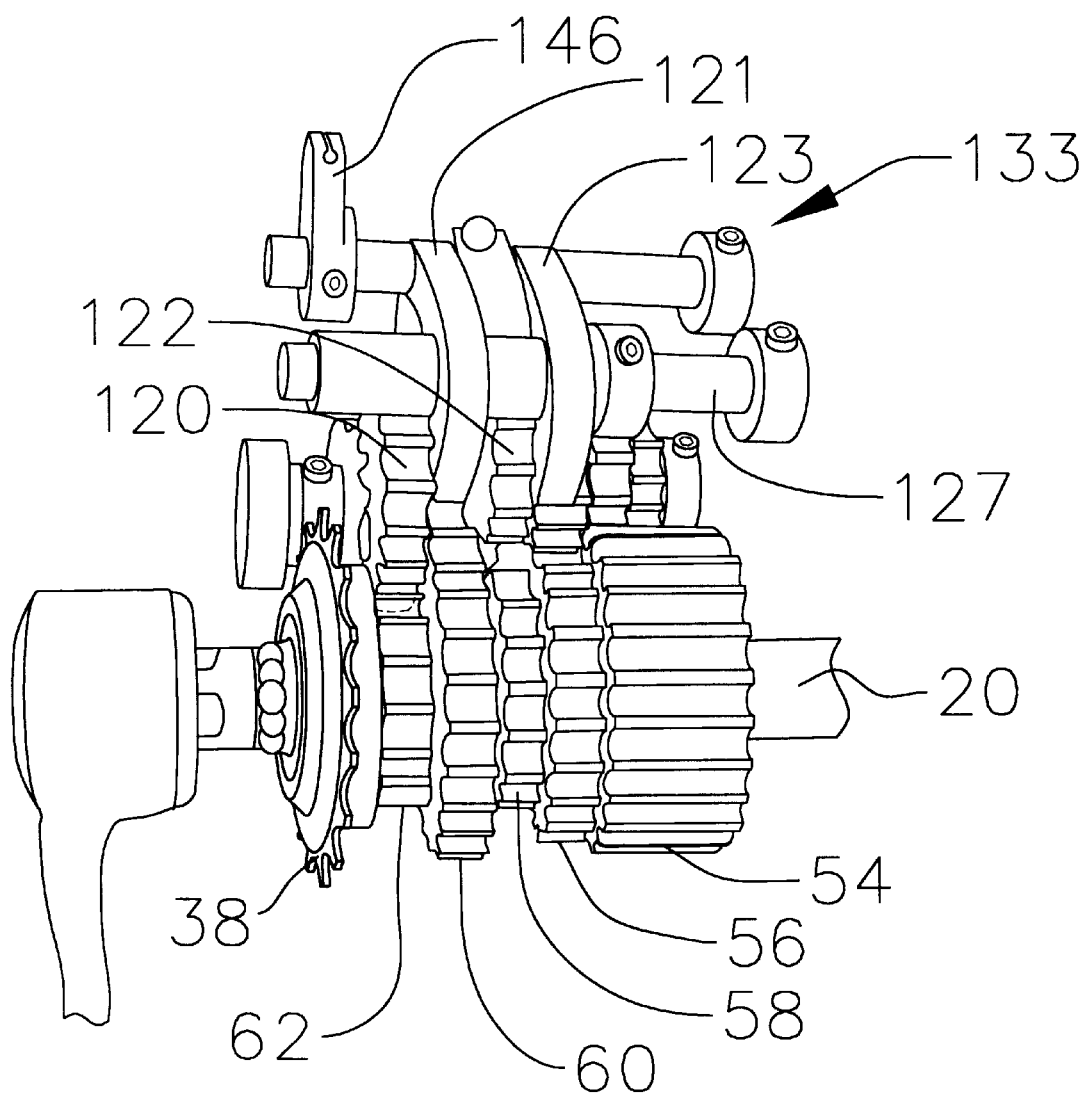
FIG. 26 shows another partial perspective view of the transmission of FIGS. 18–19 wherein both auxiliary pinion gears are engaged.

In FIGS. 18–19, the permanent gear 52 rotates in the opposite direction of that in FIGS. 10–11 due to transfer of torque from the gear 74 to the gear 58 via the pinion gear 122. With the pinion gears 78 and 120 engaged, when the pinion gear 122 is engaged, the pedaling effort is increased, providing for higher bike speed. As such, when the pinion gears 78, 120 and 122 are engaged, the transmission requires the highest pedaling effort and provides most speed for the bike. When only the pinion gear 84 is engaged, the transmission requires the lowest pedaling effort and provides the lowest bike speed.

The selection means 133 can be controlled via a cable 147 from a bicycles break lever, wherein the cable 147 is attached to the lever 146 for rotating the shaft 135. In one embodiment, under normal gear selection operation, both of the gears 120 and 122 are engaged. The break pedal is pulled full stroke for breaking, both of the gears 120 and 122 are disengaged. In another embodiment, a select lever can be included on the break lever to enable the following gear selection modes: (1) when the select lever is in a first position (e.g., pulled back relative to break lever), after the break lever is released, both pinion gears 120 and 122 are engaged again; (2) when the select level is in a second position (e.g., aligned with break lever, after the break lever is released, both the pinion gears 120 and 122 are disengaged; and (3) when the select lever is in a third position (e.g., pushed forward relative to the break lever), after the break lever is released, only one auxiliary pinion gear (e.g., gear 122) is disengaged, the other auxiliary pinion gear is engaged again.

As shown in the drawings, the transmission 10 can include both the primary pinion gears 48 and the auxiliary pinion gears 119 as described above, wherein a user can selectively and simultaneously engage/disengage the primary and secondary pinion gears 48, 119 as described above.

Although the present invention has been described in considerable detail with regard to the preferred versions thereof, other versions are possible. Therefore, the appended claims should not be limited to the descriptions of the preferred versions contained herein.

What is claimed is:

1. A multi-speed transmission for bicycles, comprising:
   (a) a housing including spaced, opposing face plates, each face plate having a pedal shaft opening and a secondary shaft opening;
   (b) a pedal shaft rotatably disposed within said pedal shaft openings;
   (c) a secondary shaft disposed within said secondary shaft openings, wherein the secondary shaft is spaced from the pedal shaft and substantially parallel thereto;
   (d) a pedal shaft set of gears mounted on the pedal shaft between the face plates, comprising: (1) a first set of pedal shaft gears mounted on the pedal shaft, (2) a second set of pedal shaft gears rotatably mounted on the pedal shaft, and (3) a third set of pedal shaft gears rotatably mounted on the pedal shaft and including first means for selective driving engagement with the second set of pedal shaft gears, the third set of pedal shaft gears including a drive gear means for engaging and drive;
   (e) a secondary shaft set of gears mounted on the secondary shaft between the face plates, comprising: (1) a first set of secondary shaft gears mounted on the secondary shaft, and (2) a second set of secondary shaft gears rotatably mounted on the secondary shaft and including second means for selective driving engagement with the first set of secondary shaft gears;
   (f) a set of primary pinion gears rotatably attached to means for selectively engaging each pinion gear between the first set of pedal shaft gears and the first set of secondary shaft gears;
   (g) a permanent pinion gear engaged between the second set of pedal shaft gears and the second set of secondary shaft gears; and
   (h) a set of auxiliary pinion gears including: (1) a first pinion gear rotatably attached to first engagement means for selectively engaging the first pinion gear between the first set of secondary shaft gears and the second set of pedal shaft gears; and (2) a second pinion gear rotatably attached to second engagement means for selectively engaging the second pinion gear between the second set of secondary shaft gears and the third set of pedal shaft gears.

2. The multi-speed transmission of claim 1, wherein said means for selectively engaging the primary pinion gears comprises a set of arms each corresponding to said one of primary pinion gears, said each arm having a proximal end pivotally attached to the housing, and a distal end to which said corresponding primary pinion gear is rotatably attached, said arm having a first pivot position where and primary gear is engaged, and a second pivot position where said primary pinion gear is disengaged.

3. The multi-speed transmission of claim 1, wherein the first set of pedal shaft gears comprises at least two integral gears having different numbers of teeth.

4. The multi-speed transmission of claim 1, wherein the second set of pedal shaft gears comprises at least one gear.

5. The multi-speed transmission of claim 1, wherein the third set of pedal shaft gears comprises at least two integral gears having different numbers of teeth.

6. The multi-speed transmission of claim 1, wherein the set of primary pinion gears comprises at least two primary pinion gears.

7. The multi-speed transmission of claim 1, wherein the primary pinion gears have different numbers of teeth.

8. The multi-speed transmission of claim 1, wherein the first set of secondary shaft gears comprises at least two integral gears having different numbers of teeth.

9. The multi-speed transmission of claim 1, wherein the second set of secondary shaft gears comprises at least one gear.

10. The multi-speed transmission of claim 1 further including means for selective driving engagement of the first set of pedal shaft gears with the pedal shaft comprising pawl means effectively subject to stress only during forward rotative displacement of said pedal shaft.

11. The multi-speed transmission of claim 10 wherein said stress is compressive.

12. The multi-speed transmission of claim 1 wherein said first means for selective driving engagement of the third set of pedal shaft gears with the second set of pedal shaft gears comprises pawl means effectively subject to stress only during forward rotative displacement of said pedal shaft.

13. The multi-speed transmission of claim 12 wherein said stress is compressive.

14. The multi-speed transmission of claim 1 wherein said second means for selective driving engagement of the second set of secondary shaft gears with the first set of secondary shaft gears comprises pawl means effectively subject to stress only during forward rotative displacement of said pedal shaft.

15. The multi-speed transmission of claim 14 wherein said stress is compressive.

16. The multi-speed transmission of claim 1 wherein said drive gear means includes a pedal drive sprocket.

17. The multi-speed transmission of claim 1 wherein said auxiliary pinion gears have different numbers of teeth.

18. The multi-speed transmission of claim 1, wherein said first engagement means for selectively engaging the first auxiliary pinion gear comprises an arm having a proximal end pivotally attached to the housing, and a distal end to which the first auxiliary pinion gear is rotatably attached, said arm having a first pivot position where the first auxiliary pinion gear is engaged, and a second pivot position where the first auxiliary pinion gear is disengaged.

19. The multi-speed transmission of claim 1, wherein said second engagement means for selectively engaging the second auxiliary pinion gear comprises an arm having a proximal end pivotally attached to the housing, and a distal end to which the second auxiliary pinion gear is rotatably attached, said arm having a first pivot position where the second auxiliary pinion gear is engaged, and a second pivot position where the second auxiliary pinion gear is disengaged.

20. The multi-speed transmission of claim 1, wherein when one of the primary pinion gears is engaged between the first set of pedal shaft gears and the first set of secondary shaft gears, applying rotary torque to the pedal shaft causes: (1) the first set of pedal shaft gears to rotate the first set of secondary shaft gears via the engaged primary pinion gear, (2) the first set of secondary shaft gears rotate the second set of secondary shaft gears, (3) the second set of secondary shaft gears rotate the second set of pedal shaft gears via the permanent pinion gear, and (4) the second set of pedal shaft gears rotate the third set of pedal shaft gears thereby rotating said drive gear means.

21. The multi-speed transmission of claim 20 further comprising pinion gear selection means for controlling said first and second engagement means, the pinion gear selection means having: (i) a first control position whereby the first and the second auxiliary pinion gears are engaged, (ii) a second control position whereby the first and the second auxiliary pinion gears are disengaged, and (iii) a third control position whereby the first auxiliary pinion gear is disengaged, and the second auxiliary pinion gear is engaged.

22. The multi-speed transmission of claim 21, wherein in the third control position, the second auxiliary pinion gear is engaged between the third set of pedal shaft gears and the second set of secondary shaft gears, such that applying rotary torque to the pedal shaft causes: (1) the first set of pedal shaft gears to rotate the first set of secondary shaft gears via the engaged primary pinion gear, (2) the first set of secondary shaft gears rotate the second set of secondary shaft gears, and (3) the second set of secondary shaft gears rotate the third set of pedal shaft gears via the second auxiliary pinion gears thereby rotating said drive gear means.

23. The multi-speed transmission of claim 21, wherein in the first control position the second auxiliary pinion gear is engaged between the third set of pedal shaft gears and the second set of secondary shaft gears, and the first auxiliary pinion gear is engaged between the first set of secondary shaft gears and the second set of the pedal shaft gears, such that applying rotary torque to the pedal shaft causes: (1) the first set of pedal shaft gears to rotate the first set of secondary shaft gears via the engaged primary pinion gear, (2) the first set of secondary shaft gears rotates the second set of pedal shaft gears via the first auxiliary pinion gear, (3) the second set of pedal shaft gears rotates the second set of secondary shaft gears via the permanent gear, (4) the second set of secondary shaft gears rotates the third set of the pedal shaft gears via the second auxiliary pinion gear, thereby rotating said drive gear means.

* * * * *